US006437527B1

(12) United States Patent
Rhodes et al.

(10) Patent No.: US 6,437,527 B1
(45) Date of Patent: Aug. 20, 2002

(54) GARAGE DOOR SECURITY DEVICE

(76) Inventors: Duane A. Rhodes, 2423 Whispering Creek Dr., Arlington, TX (US) 76018; Sean Rhodes, 4247 Tioga St., Dallas, TX (US) 75241

(*) Notice: Subject to any disclaimer, the term of this patent is extended or adjusted under 35 U.S.C. 154(b) by 146 days.

(21) Appl. No.: 09/594,348

(22) Filed: Jun. 15, 2000

Related U.S. Application Data

(60) Provisional application No. 60/139,730, filed on Jun. 18, 1999.

(51) Int. Cl.[7] .......... H02P 1/22

(52) U.S. Cl. .......... 318/280; 318/264; 318/265; 318/281; 318/282; 318/283; 318/286; 318/466; 318/468; 340/825.12; 340/825.2

(58) Field of Search .......... 318/264, 265, 318/280, 282, 283, 286, 466, 468; 340/825.2, 825.12

(56) References Cited

U.S. PATENT DOCUMENTS

| | | | | |
|---|---|---|---|---|
| 4,408,146 A | * | 10/1983 | Beckerman | 318/264 |
| 4,429,264 A | | 1/1984 | Richmond | |
| 4,463,292 A | | 7/1984 | Englemann | |
| 4,821,024 A | | 4/1989 | Bayha | |
| 4,939,434 A | | 7/1990 | Elson | |
| 5,027,553 A | | 7/1991 | Vergara | |
| 5,357,183 A | * | 10/1994 | Lin | 318/468 |
| 5,656,900 A | * | 8/1997 | Michel et al. | 318/286 |
| 5,793,300 A | * | 8/1998 | Suman et al. | 340/825.2 |
| 5,903,226 A | * | 5/1999 | Suman et al. | 340/825.69 |
| 5,969,637 A | * | 10/1999 | Doppelt et al. | 340/825.69 |
| 6,020,703 A | * | 2/2000 | Telmet | 318/480 |
| 6,075,333 A | * | 6/2000 | Huddle | 318/468 |
| 6,181,095 B1 | * | 1/2001 | Telmet | 318/480 |
| 6,326,754 B1 | * | 12/2001 | Mullet et al. | 318/480 |

FOREIGN PATENT DOCUMENTS

| | | |
|---|---|---|
| CA | 724530 | 12/1965 |
| FR | 2234792 | 2/1975 |

* cited by examiner

*Primary Examiner*—Robert E. Nappi
*Assistant Examiner*—Tyrone Smith
(74) *Attorney, Agent, or Firm*—Richard C. Litman

(57) ABSTRACT

An adjunct device for a garage door opener and closer system containing a microprocessor which automatically closes the garage door after a 45 second delay, and includes three LED's to indicate the door closure, motion detection, and a manual override of the system. The adjunct device has a push button switch which programs the adjunct device to the same infrared frequency as the conventional garage door opener device. The adjunct device also contains a manual override element, an oscillator circuit, a reset circuit, a surge protector circuit, and a voltage regulator circuit.

4 Claims, 5 Drawing Sheets

GARAGE DOOR SECURITY DEVICE

CROSS-REFERENCE TO RELATED APPLICATION

This application claims the benefit of U.S. Provisional Patent Application Serial No. 60/139,730, filed Jun. 18, 1999.

BACKGROUND OF THE INVENTION

1. Field of the Invention

The present invention relates generally to a garage door security devices and, more specifically, to an adjunct device for a garage door opener and closer system which automatically closes the garage door after a 45 second delay, and includes a manual visual deactivation element for signalling the on/off condition of the device. The device contains a surge protector to protect the device and the door opener.

2. Description of Related Art

The related art of interest describes various garage door opening and closing systems, but none describes the compact and economical adjunct device of the present invention. The related art will be discussed in the order of perceived relevance to the present invention.

U.S. Pat. No. 4,463,292 issued on Jul. 31, 1984, to Robert J. Engelmann describes a security timer for an automatic garage door opener which causes the door to close after an interval with a warning buzzer signal. A timer switch mounted on the ceiling is engaged when the door is fully open. The security timer includes an oscillator that provides pulses. A counter counts the pulses and provides a binary output. Engagement of the timer switch signals the oscillator and counter in the security box mounted on a wall to begin. When the predetermined number of pulses have been counted, a relay switch is closed for signaling the operator unit of the door to close and to activate a buzzer alarm. The security box has a disabling switch. A manual switch is mounted next to the security box. The security system is distinguishable for its separate roof mounted timer switch device and the separate manual switch.

U.S. Pat. No. 5,357,183 issued on Oct. 18, 1994, to Chii C. Lin describes an automatic control and safety device for a garage door opener system. The device provides an automatic reclose and safety reverse if an obstruction is observed. Photoelectric sensors are positioned across the garage door opening to detect the passage of the vehicle in or out of the garage when an infrared emitter device emits a pulsed radiation to a reflector which reflects the radiation to a photodetector placed above the emitter device to detect either the vehicle by the higher beam and pets or children by the lower beam. The sensors also reverse the closing of the door upon detection of an obstruction. An oscillator device, a logic box, closes the garage door to reclose if the door remained open for a predetermined time interval. A safety warning signal is generated before the oscillator controlled reclosure. A disabling switch and a manual pushbutton control are mounted together on a wall by the service door. The service door has a normally open proximity switch in the circuit with the wall controls. The system is distinguishable for its requirement for the infrared detector system and a reclose logic box.

U.S. Pat. No. 4,939,434 issued on Jul. 3, 1990, to Alfred A. Elson describes an apparatus and method for an automatic garage door operation system. The apparatus has means for closing, switching and timing connected in series. The timing means contains two cascaded timers and a trigger input. The timers delay the door closing for 50 to 190 seconds and are automatically deactivated when the door is closed. The apparatus is distinguishable for relying on cascaded timers.

U.S. Pat. No. 5,027,553 issued on Jul. 2, 1991, to Florentino S. Vergara describes an add-on device for a motorized garage door opener system for automatically closing the door after a delay. The add-on device comprises one or two actuators cooperating with a spring-biased pin or pins to reverse the motor. A manual switch to start the door opening operation and another manual switch to keep the door open are shown. The time delay circuit of 2 to 3 minutes to keep the door open is deemed conventional. The add-on device is distinguishable for its connection to the tubular track adjacent to the door opening casing.

U.S. Pat. No. 4,821,024 issued on Apr. 11, 1989, to Allan T. Bayha describes a door operator pre-warning system involving a warning light and horn inside the garage when only opening the door either by battery powered signal transmitter or a wall switch. The system is distinguishable for its limitation to a door opening warning system.

U.S. Pat. No. 4,429,264 issued on Jan. 31, 1984, to Moscow K. Richmond describes a system and method for the automatic control of electrically operated gates. The system is distinguishable for its requirement for a photo interrupter and photodetector of pulses generated by a rotating apertured disc.

Canadian Patent No. 724,530 issued on Dec. 28, 1965, to Cecil J. Watkins describes an automatic door opening system for a door pivoting in both directions from one vertical internal shaft operated by a hydraulic system. Four interconnected relays to move and keep the door open in either position by a timing system which comprises a condenser which is charged and discharged to determine the time period that the door is open. The system is distinguishable for a timing system depending on relays and a condenser.

French Patent No. 2,234,792 issued on Feb. 21, 1975, describes an automatic Doppler radar door control system having delay circuits with a double inverter and controlling motors. The system is distinguishable for its expensive Doppler radar control.

None of the above inventions and patents, taken either singly or in combination, is seen to describe the instant invention as claimed.

SUMMARY OF THE INVENTION

The present invention is an adjunct device for an automatic garage door opener and closer system which automatically closes the garage door after a 45 second delay and includes a manual visual deactivation element for signalling the on/off condition of the device.

Accordingly, it is a principal object of the invention to provide an adjunct security device for an automatic garage door opener and closer system.

It is another object of the invention to provide an adjunct security device for an automatic garage door opener and closer system which closes the door after a predetermined time interval.

It is a further object of the invention to provide an adjunct security device for an automatic garage door opener and closer system which includes an on/off switch for controlling the adjunct device.

Still another object of the invention is to provide an adjunct security device for an automatic garage door opener and closer system which includes a visual deactivation element for signalling the on/off condition of the device.

Yet another object of the invention is to provide an adjunct security device for an automatic garage door opener and closer system which includes a surge protector.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
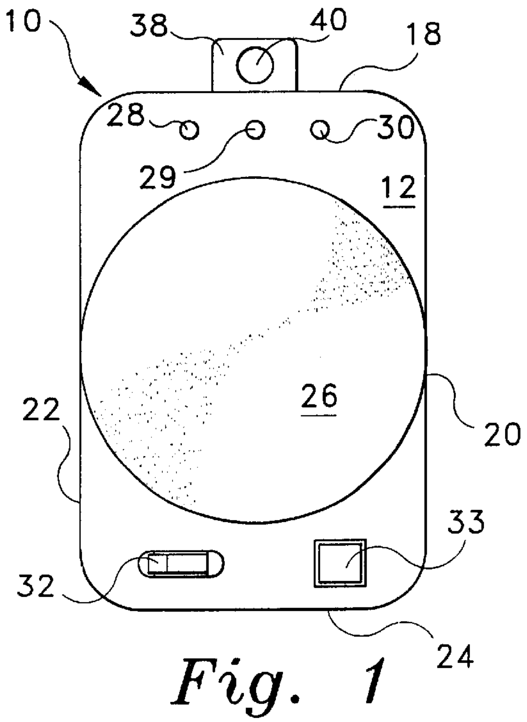
FIG. 1 is a front elevational view of a garage door security device according to the present invention.
Figure 2:
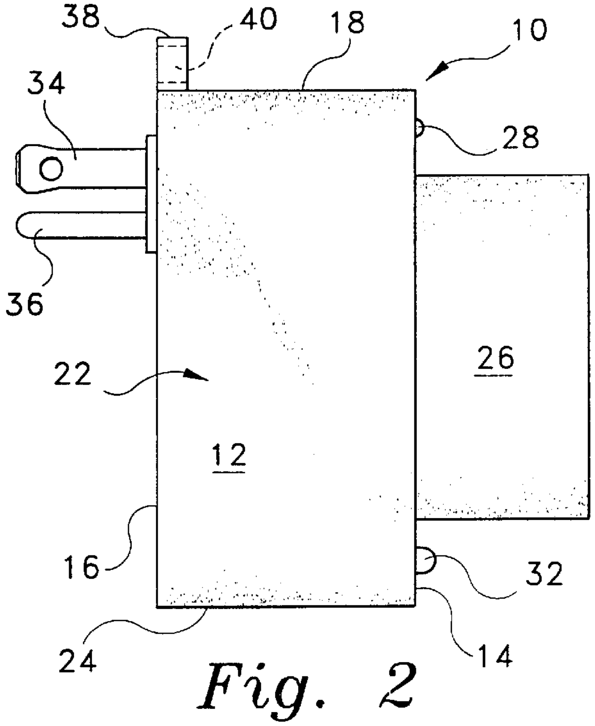
FIG. 2 is a left side elevational view of the device.
Figure 4:
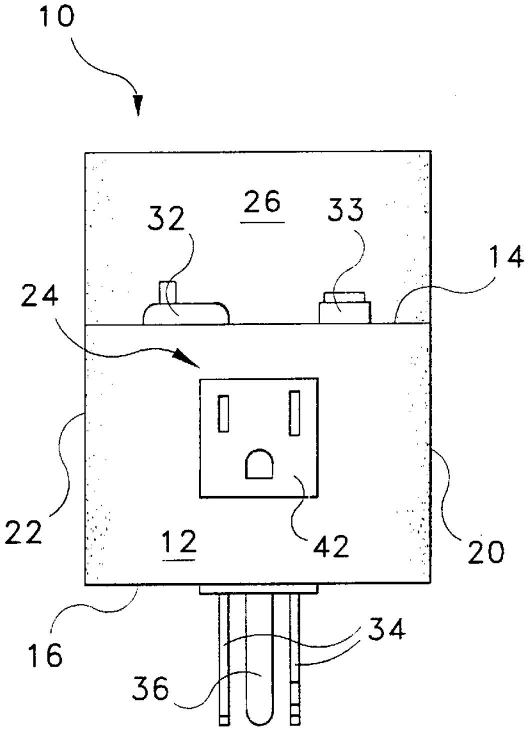
FIG. 4 is a bottom view of the device.
Figure 3:
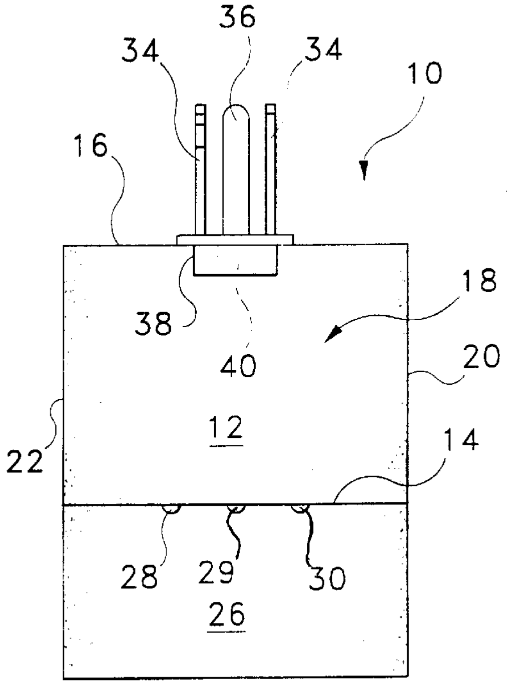
FIG. 3 is a top plan view of the device.
Figure 5:
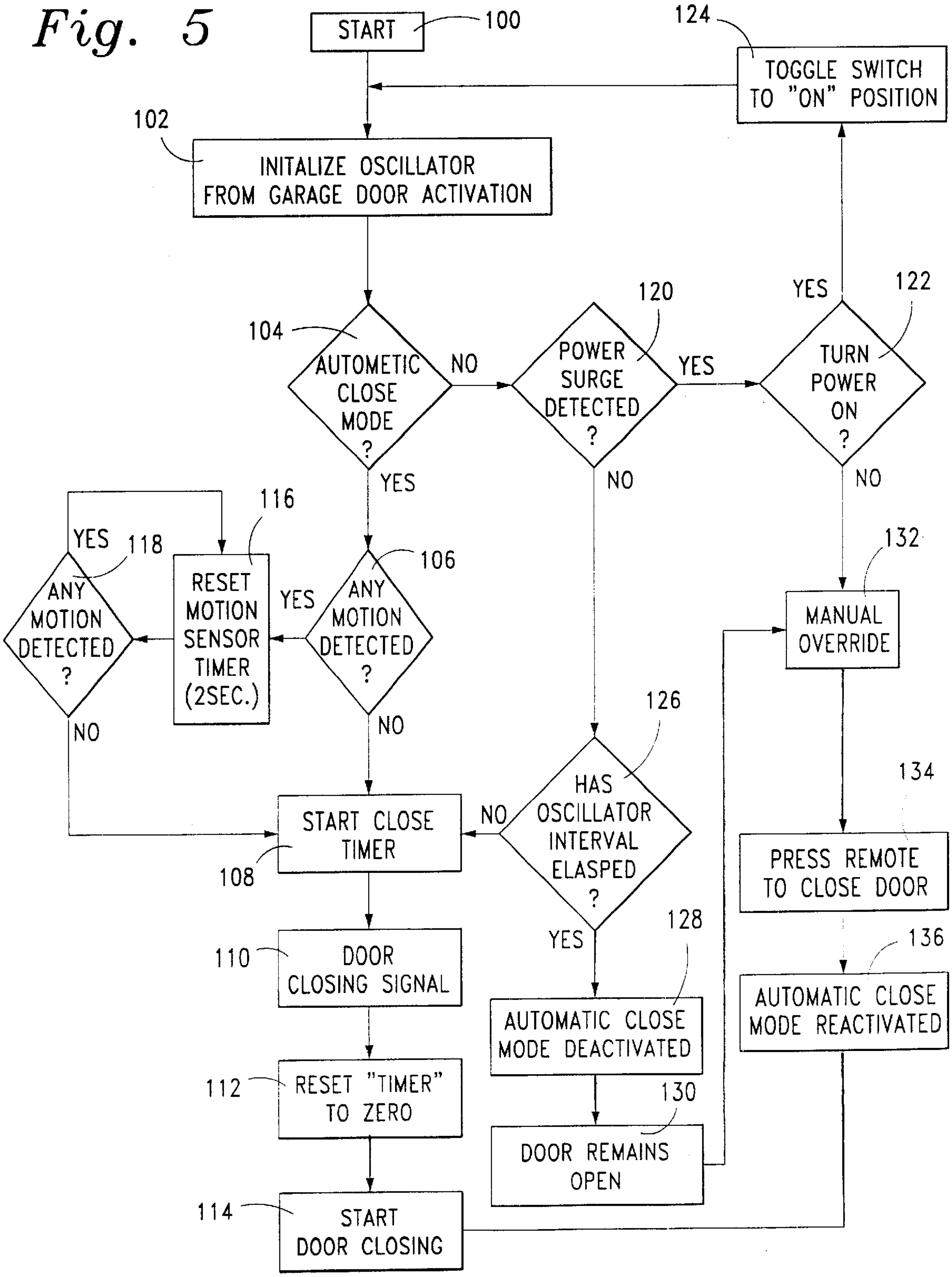
FIG. 5 is a schematic block flow chart of the garage door security system.

The present invention is an adjunct security device 10 shown in various views in FIGS. 1 through 4 for a conventional garage door opener and closer system operated by remote infrared transmitters and receivers. The device 10 has a rectangular casing 12 having a front surface 14, a rear surface 16, a top surface 18, a right side surface 20, a left side surface 22, and a bottom surface 24. An infrared sensor element 26 is positioned on a central area of the front surface 14 of the casing 12 for receiving an infrared radiation signal from a conventional door opener device (not shown). The infrared sensor element 26 includes a motion detector element which serves as a safety feature. The motion detector will have a 360° protection zone which includes a radius of at least 15 feet. If the motion sensor detects movement within the 30 foot circular area, an electrical timing circuit will restart its count of 45 seconds until the movement stops as seen when FIG. 5 is explained below. This function prevents the garage door from closing if the homeowner has to retrieve merchandise from the vehicle.

A red light emitting diode (LED) 28, a yellow LED 29 and a green LED 30 are located on the front surface 14 and proximate the top surface 18 of the casing 12. The red LED 28 when lit indicates there is a motion detected of a body proximate the garage door. The yellow LED 29 when lit indicates that the garage door is closed. The green LED 30 when lit indicates that a manual override switch 150 (FIG. 6) has been activated.

An on/off sliding toggle switch 32 for operating the system 10 and a push button switch 33 for programming the device 10 are also located on the front surface 14 and proximate the bottom surface 24 of the casing 12. Three electrical contact elements consisting of a pair of electrodes 34 and a ground electrode 36 are provided for connection and grounding to a grounded electrical wall outlet.

The casing 12 has a projecting support tab 38 centrally located on the top surface 18 of the casing 12. The tab 38 has an aperture 40 sized for attaching conveniently to an existing electrical wall outlet panel (not shown) with the panel mounting screw. The casing 12 can be produced with either a translucent or a substantially opaque plastic material. However, if the casing 12 is made of opaque material, the region around the infrared sensor 32 must be translucent in order for the motion detector 106 to be fully effective. An accessory plug outlet 42 is provided on the bottom surface 24 for insertion of any other appliance's electrical plug.

An electrical timing circuit and a surge protector (not shown) is housed within the casing 12. The surge protector will protect the circuitry of both the garage door security device 10 and the conventional garage door opener (not shown). The adjunct garage door security device 10 will automatically close an opened garage door after a timed delay of a predetermined interval such as 45 seconds, and the system can be deactivated by utilizing the on/off switch 32 in view of the lit green light emitting diode (LED) 30 to indicate an "on" or active condition of the system.

Thus, a home owner can conveniently use their existing garage door opener remote control device to close the garage door, having 45 seconds to drive out the car before the garage door automatically closes. Once the garage door is open, the home owner must press the conventional garage door opener remote control in intervals which deactivates the automatic mode (128) of the garage door security device 10 and allows the door to remain open. The garage door security device 10 must receive two oscillator frequencies in order for this function to operate. To reactivate the device 10, the home owner must press the conventional garage door opener remote only once. This function will reactivate the door security device 10 as well as closing the garage door manually.

When the owner returns and opens the garage door to park inside his garage, he has 45 seconds to enter before the door closes automatically. When he desires that the garage door remain open, he can move the switch 32 to the "off" position, which allows the garage door to maintain an open position.

The push button switch 33 programs the device 10 to the same infrared frequency as the conventional garage door opener. This programming is done by pressing and holding the push button 33 in the "on" position while pressing and releasing the "Learn" button on the conventional garage door opener, which will indicate that the programming is effected. When the conventional garage door opener indicates that identical frequencies of the two devices have been effected, the home owner can release the push button 33 on the device 10.

The adjunct device 10 is simple to install by just inserting the pair of electrodes 34 and the ground electrode 36 into the garage's electrical outlet apertures and even utilize the existing panel screw to connect the projecting and apertured support tab to the wall outlet.

FIG. 5 illustrates the garage door security device operating system 100 in a block flow chart starting at top with step 102 to initialize the oscillator by activating the garage door control by toggle switch 32. In step 104, the automatic close mode in the device 10 determines whether any motion is detected in step 106. When no motion is detectable, the timer element starts the closing process in step 108 to signal that the garage door should be closed and sends a door closing signal in step 110. The timer in device 10 resets itself to zero in step 112. Thus, the garage door begins to close in step 114.

If any motion in step 106 is detected the motion sensor timer is reset in 2 seconds in step 116. Consequently, in step 118 the determination whether any motion is detected is made. If motion is detected, the motion sensor is reset in step 118. If motion is not detected, the timer signals to close in step 108.

If in the automatic close mode step 104, there is no closure signal, then the power surge element in the step 120 is activated to determine whether there is a power surge or not. If there is a power surge, the power surge element must decide in step 122, whether to turn the electrical power on or off. If the decision predetermined by the power surge element is positive, the toggle switch in step 124 is set in the "on" position, and the oscillator can again be initialized in step 102.

If the decision predetermined by the power surge element is negative in step 120 and determined by the oscillator element in step 126 that the oscillator interval has elapsed, then in step 128, the automatic close mode of the garage door is deactivated. Consequently, the garage door in step 130 remains open and can be overridden by manual control in step 132 and by pressing the remote control device to close the garage door in step 134. Therefore, in step 136 the automatic close mode of the device 10 is reactivated to begin closing the garage door in step 114.

If the oscillator interval has not elapsed in step 126, the close cycle of the timer in step 108 is activated to signal the closing of the garage door in step 110 and on to steps 112 and 114.

The casing 12 of the adjunct security device 10 can be either translucent or opaque plastic material, but the area around the infrared sensor element 26 must be made of translucent plastic.

Figure 6A:
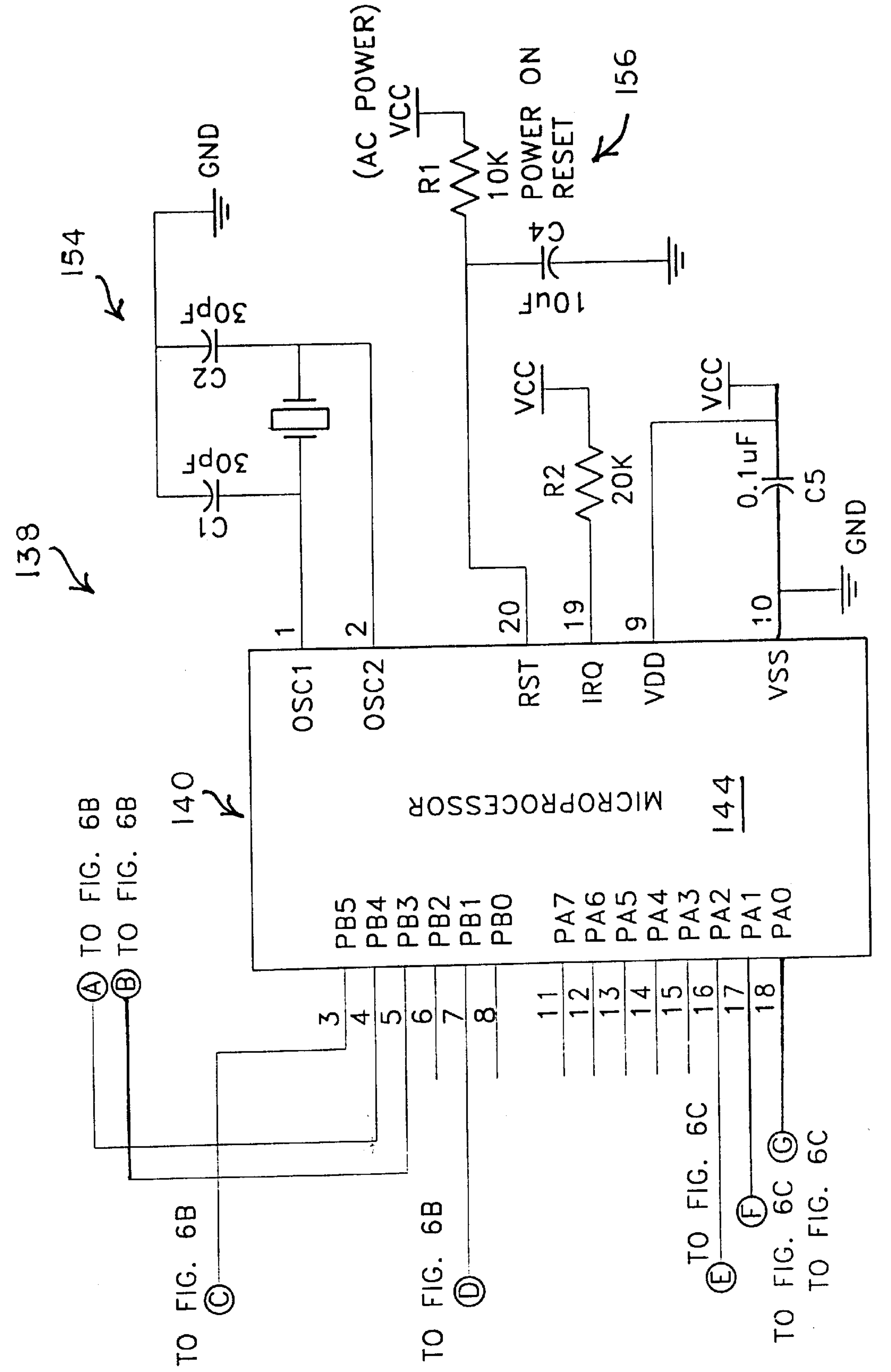
FIGS. 6A, 6B and 6C are segments of a circuit diagram of the garage door security device.

In FIG. 6A, a circuit diagram 138 for device 10 is shown with the microprocessor circuit 140. A microprocessor 144, Model 68705A, MC68HC705J1A was used. A programmable infrared detector (PIR) 146 having a 5 volt A.C. source VCC and grounded at GND transmits its signal on detection of a foreign body in the doorway to port 3 and input PB 5.

Figure 6B:
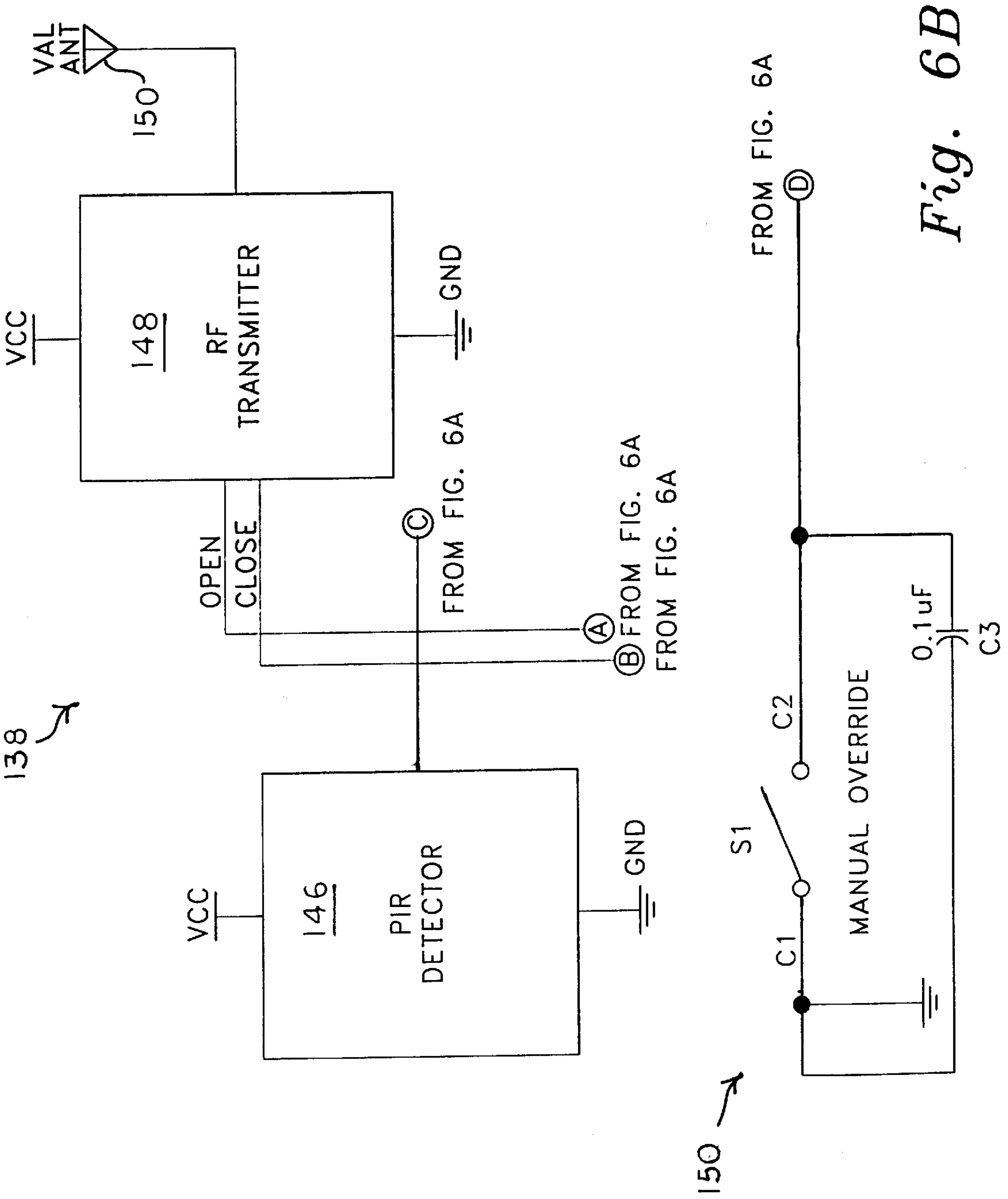

In FIG. 6B, a radio frequency transmitter element 148 having an antenna 150 is energized by A.C. voltage at VCC and grounded at GND. The transmitter 148 when operated by the user can open the garage door by a signal in line 4 or A to input port PB 4 of the microprocessor 144. The transmitter 148 can close the garage door by a signal in line 5 or B to input port PB 3. A manual override element 150 has a switch S1 to close the grounded circuit between the lines C1 and C2 with a 0.1 microfarad capacitor C3 to signal the microprocessor 144 through line 7 or D to port PB 1. It is noted that other input ports listed as PB2 (line 6) and PB0 (line 8) are available in the microprocessor 144 in FIG. 6A.

Figure 6C:
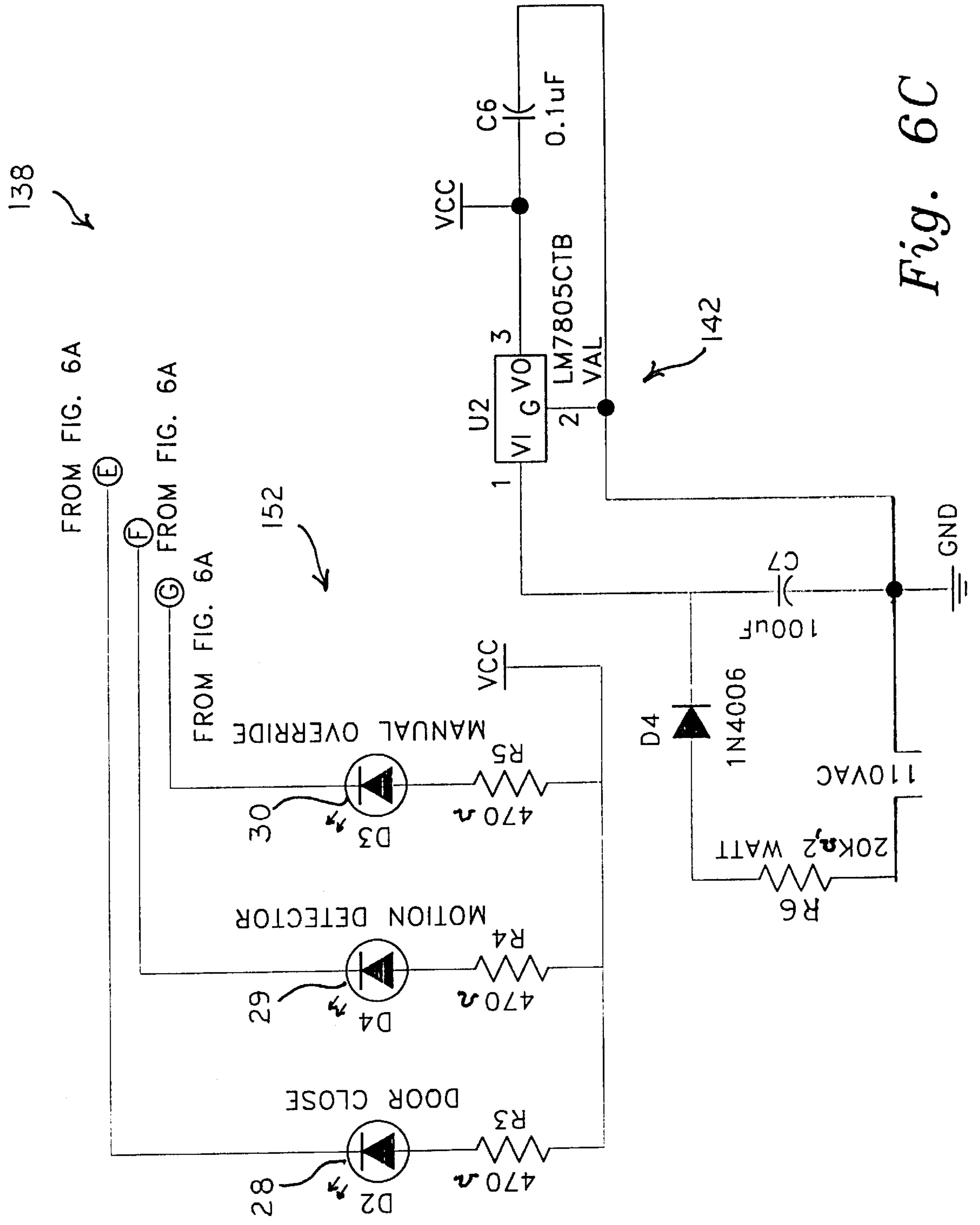

In the upper portion of FIG. 6C, the diodes circuit 152 has a door close indicator diode D2 (28) with a resistor R3, a motion detector diode D1 (29) (yellow LED) with a resistor R4, and the manual override diode D3 (30) with a resistor R5. Each diode is connected to a common VCC and to the microprocessor 144 by output line 16 or E to PA 2 for diode D2 (28), output line 17 or F to (PA 1) for diode D1 (29), and output line 18 or G to (PAO) for diode D3 (30). The resistors R3, R4 and R5 have the same value of 470 ohms As shown in FIG. 6A, the other unused input lines 11–15 for ports PA 3–7 in the microprocessor 144 are available for other inputs.

In FIG. 6A, the oscillator circuit 154 has two 30 picofarad capacitors C1 and C2 in parallel with an oscillator X1 comprising a piezoelectric crystal having a value of 4.0 Megahertz inputing by line 1 to the port OSC 1 of the microprocessor 144. The capacitor circuit is also grounded by GRD and in series with line 2 inputing into the port OSC 2 of the microprocessor 144.

As shown in FIG. 6A, a reset circuit 156 has a filter element comprising a 5 volt source at VCC, a resistor R1 having a value of 10 kiloohms, and a capacitor C4 having a value of 30 microfarads leading to a ground (GND). The main line 20 inputs at port RST (reset).

At port IRQ in FIG. 6A, line 19 has a resistor R2 having a value of 20 kiloohms leading to an input source VCC. Port VDD has line 9 connected in parallel to port VSS and line 10 which has a ground GND and a capacitor C5 having a value of 0.1 microfarad.

In the lower portion of FIG. 6C, the voltage regulator or surge protector circuit 142 comprises a 110 Volt A.C. source feeding a resistor R6 having a value of 20 kiloohm and 2 Watts and a diode D4 (1N4006). Another capacitor C7 having a value of 100 microfarads is in parallel with resistor R6 and grounded at GRD. An ancillary circuit is connected in parallel with capacitor C7 and in series with D4 by line 1 to a voltage regulator U2, i.e., LM7805CTB VAL, having a voltage input V1, a lead G, and a voltage out VO. Line 3 from the voltage out lead VO has a voltage input VCC and a capacitor CG having a value of 0.1 microfarad in parallel with line 2 and continues on to join the main circuit.

Thus, a comprehensive device 10 has been shown for adding to a conventional door closing circuit, which includes a motion detector and a programming capacity by simply plugging in.

It is to be understood that the present invention is not limited to the sole embodiment described above, but encompasses any and all embodiments within the scope of the following claims.

We claim:

1. An adjunct device for a garage door opener and closer system comprising:

a rectangular casing having a front surface, a rear surface, a top surface, a right side surface, a left side surface, and a bottom surface;

an infrared sensor element positioned on a central area of the front surface of the casing for receiving an infrared radiation signal from a conventional door opener device;

arranged in a row, a red light emitting diode for indicating a dangerous motion proximate the garage door, a yellow light emitting diode for indicating the garage door is closed, and a green emitting diode for indicating the use of a manual override located on the front surface and proximate the top surface of the casing;

a microprocessor contained within the case;

an on/off slide switch located on the front surface and proximate the bottom surface of the casing for operating the infrared sensor element;

a push button switch adjacent to said on/off slide switch for programming the memory of the microprocessor;

three electrical contact elements for connection and grounding to an electrical wall outlet;

a support tab having an aperture for attaching to the electrical wall outlet with an existing screw;

an electrical timing circuit housed within the casing, and whereby the adjunct garage door security device will automatically close an opened garage door after a timed delay of approximately 45 seconds, and can be deactivated by utilizing the on/off slide switch in view of the green light emitting diode.

2. The adjunct device according to claim 1, including a surge protector element for protecting the adjunct device and a garage door opener device.

3. An adjunct device for a garage door opener and closer system comprising:

a rectangular casing having a front surface, a rear surface, a top surface, a right side surface, a left side surface, and a bottom surface;

an infrared sensor element positioned on a central area of the front surface of the casing for receiving an infrared radiation signal from a conventional door opener device; and including a motion detector having a 360° protection zone and a 15 feet radius capacity;

arranged in a row, a red light emitting diode for indicating a dangerous motion proximate the garage door, a yellow light emitting diode for indicating the garage door is closed, and a green emitting diode for indicating the use of a manual override located on the front surface and proximate the top surface of the casing;

a microprocessor contained within the case;

an on/off slide switch located on the front surface and proximate the bottom surface of the casing for operating the infrared sensor element;

a push button switch adjacent to said on/off slide switch for programming the memory of the microprocessor;

three electrical contact elements for connection and grounding to an electrical wall outlet;

a support tab having an aperture for attaching to the electrical wall outlet with an existing screw;

an electrical timing circuit housed within the casing, and whereby the adjunct garage door security device will automatically close an opened garage door after a timed delay, and can be deactivated by utilizing the on/off slide switch in view of the green light emitting diode.

4. The adjunct device according to claim 3, including a surge protector element for protecting the adjunct device and a garage door opener device.

* * * * *